US012050488B2

(12) United States Patent
Rock et al.

(10) Patent No.: US 12,050,488 B2
(45) Date of Patent: Jul. 30, 2024

(54) SYSTEM AND METHOD TO MAINTAIN CLOCK STABILITY IN A COMPLEX COMPUTING PLATFORM

(71) Applicant: Dell Products L.P., Round Rock, TX (US)

(72) Inventors: Jason Christopher Rock, Austin, TX (US); Jonathan Foster Lewis, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 209 days.

(21) Appl. No.: 17/956,721

(22) Filed: Sep. 29, 2022

(65) Prior Publication Data

US 2024/0111327 A1     Apr. 4, 2024

(51) Int. Cl.
  *G06F 1/12*  (2006.01)
  *G06F 1/06*  (2006.01)
  *G06F 1/20*  (2006.01)

(52) U.S. Cl.
  CPC ............ *G06F 1/12* (2013.01); *G06F 1/06* (2013.01); *G06F 1/206* (2013.01)

(58) Field of Classification Search
  CPC ... G06F 1/12; G06F 1/08; G06F 1/206; G06F 1/20
  See application file for complete search history.

(56) References Cited

U.S. PATENT DOCUMENTS

| | | | | |
|---|---|---|---|---|
| 8,416,812 B2 * | 4/2013 | Radulescu | ............... | G04G 7/00 370/503 |
| 2014/0348278 A1 * | 11/2014 | Wong | ................... | H04J 3/0638 375/355 |
| 2015/0308627 A1 * | 10/2015 | Hoskins | .................... | F17D 5/06 702/45 |
| 2015/0364953 A1 * | 12/2015 | Rippon | ............ | H02J 13/00034 327/156 |

(Continued)

OTHER PUBLICATIONS

Frerking, Marvin E., "UFFC | History | Fifty Years of Progress in Quartz Crystal Frequency Standards" http://www.ieee-uffc.org/main/history.asp?file=frerking>, 9 pages, 1996, retrieved from Internet Archive Wayback Machine <https://web.archive.org/web/20090512022233/http://www.ieee-uffc.org/main/history.asp?file=frerking> on Oct. 27, 2022.

*Primary Examiner* — Jaweed A Abbaszadeh
*Assistant Examiner* — Cheri L Harrington
(74) *Attorney, Agent, or Firm* — Womble Bond Dickinson (US) LLP

(57) ABSTRACT

Methods and systems for performing timekeeping by a data processing system are disclosed. To perform timekeeping, the data processing system may include an oscillator that provides signals upon which time keeping is based. The signal provided by the oscillator may be impacted by the temperature of the oscillator. During periods of time when the data processing system may communicate with other devices, the data processing system may perform cooperative timekeeping synchronization through exchange of data with the other devices. During periods of time when the data (Continued)

processing system may not perform cooperative timekeeping synchronization, the data processing system may perform independent timekeeping synchronization by attempting to thermally stabilize the oscillator.

20 Claims, 6 Drawing Sheets

(56) References Cited

U.S. PATENT DOCUMENTS

| | | | | |
|---|---|---|---|---|
| 2016/0072513 A1* | 3/2016 | Dickerson | ............... | H03L 7/26 |
| | | | | 331/16 |
| 2016/0099716 A1* | 4/2016 | Kobayashi | ............. | H03L 1/026 |
| | | | | 327/115 |
| 2017/0288679 A1* | 10/2017 | Bryant | ................. | G01S 19/235 |
| 2020/0044657 A1* | 2/2020 | Pi | ......................... | H03L 7/0992 |
| 2020/0363832 A1* | 11/2020 | Sotiropoulos | ......... | H04J 3/0688 |
| 2021/0034096 A1* | 2/2021 | Tu | ............................ | G06F 1/04 |
| 2021/0036657 A1* | 2/2021 | Kobata | .................. | H03L 1/028 |
| 2022/0261032 A1* | 8/2022 | Bateni | ..................... | G06F 1/12 |
| 2023/0236624 A1* | 7/2023 | Levi | .................... | H04J 3/0682 |
| | | | | 713/400 |
| 2024/0014916 A1* | 1/2024 | Kernen | .................... | G06F 1/14 |

\* cited by examiner

SYSTEM AND METHOD TO MAINTAIN CLOCK STABILITY IN A COMPLEX COMPUTING PLATFORM

FIELD OF THE EMBODIMENTS

Embodiments disclosed herein relate generally to hardware management. More particularly, embodiments disclosed herein relate to systems and methods manage hardware for timekeeping.

BACKGROUND

Computing devices may perform various operations to complete computations and/or provide other services. As part of these computations and/or other services, the computing devices may exchange information with other computing devices. The information may be exchanged by passing messages between the computing devices.

BRIEF DESCRIPTION OF THE DRAWINGS

Embodiments are illustrated by way of example and not limitation in the figures of the accompanying drawings in which like references indicate similar elements.

DETAILED DESCRIPTION

Figure 1:
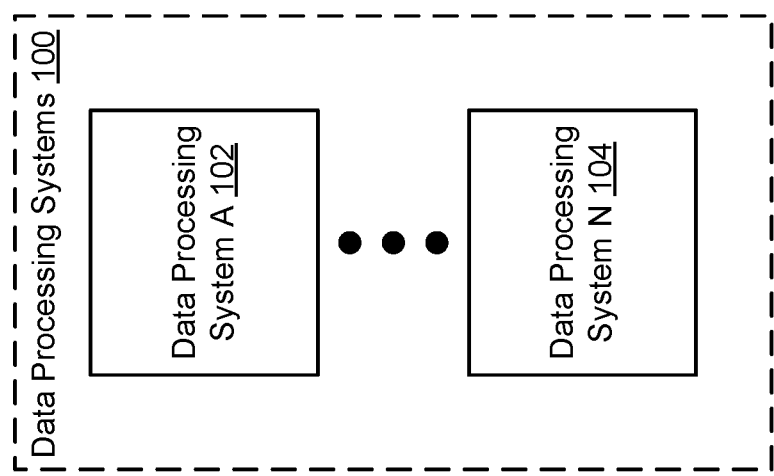
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for performing timekeeping by a data processing system. To perform timekeeping the data processing system may include an oscillator. The oscillator may provide electrical signals through which time may be kept. However, the operation of the oscillator and electrical signals provided thereby may depend on the temperature of the oscillator and characteristics of the oscillator. Consequently, different data processing systems that may use different oscillators for timekeeping may become desynchronized over time due to these differences in operation of oscillators hosted by the different data processing systems.

To perform timekeeping, the data processing system may perform both cooperative and independent timekeeping synchronizations. Cooperative timekeeping synchronizations may be performed where information may be exchanged between different data processing systems. The exchanged information may allow for differences in the operation of the oscillators of the data processing systems to be compensated thereby allowing different data processing systems to remain sufficiently timekeeping synchronized with one another and/or other devices.

However, when information may not be exchanged for between the data processing systems for timekeeping synchronization purposes (e.g., during a "holdover period"), the data processing system may perform independent timekeeping synchronization. To perform independent timekeeping synchronization, a data processing system may attempt to stabilize a temperature of an oscillator thereby allowing use of previously exchanged information to maintain timekeeping synchronization between data processing systems.

By doing so, embodiments disclosed herein may provide a data processing system that may be better able to operate under a variety of different conditions. For example, the data processing system may be able to continue to synchronize itself with other data processing systems even when unable to exchange timekeeping synchronization correction data. Consequently, embodiments disclosed herein may provide an improved data processing system that is better able to operate across a range of challenging environment such as environments in which environmental conditions (e.g., temperature) may vary significantly. For example, a data processing system in accordance with embodiments disclosed herein may be exposed to environments in which large variations in ambient temperature occur.

In an embodiment, a computer-implemented method for performing timekeeping using an oscillator of a data processing system is provided. The method may include making an identification of an occurrence of a holdover period; in response to the identification: identifying a first temperature of the oscillator at a start of the holdover period; after identifying the first temperature and during the holdover period, continuously monitoring the temperature of the oscillator to identify a change in the temperature from the first temperature; and making a first determination regarding whether the change in the temperature exceeds a threshold; in a first instance of the first determination whether the temperature exceeds the threshold: making a second determination regarding whether the temperature of the oscillator is outside of an operating temperature range of the oscillator; in a first instance of the second determination where the oscillator is outside of the operating temperature range of the oscillator: treating a clock signal provided by the oscillator as being inaccurate; and in a second instance of the second determination where the oscillator is inside of the operating temperature range: modifying a rate of heat generation by a hardware component associated with the oscillator to attempt to return the temperature of the oscillator to the first temperature.

The data processing system may include a second oscillator that provides a clock signal to a processor, the oscillator provides a second clock signal to a communication device of the data processing system, the second clock signal being used for communication purposes, and the second oscillator is not used for communication purposes.

The data processing system may be configured to perform workloads that vary over time and cause the oscillator to be heated and cooled over time.

Modifying the rate of heat generation may include reducing an energy consumption rate of the hardware component.

Reducing the energy consumption rate of the hardware component may include suspending execution of a workload hosted by the data processing system and that uses the hardware component during execution of the workload.

Reducing the energy consumption rate of the hardware component may also include reconfiguring execution of a workload hosted by the data processing system and that uses the hardware component during execution of the workload to use a second hardware component of the data processing system during the reconfigured execution of the workload.

The second hardware components may be positioned (e.g., away from the oscillator) to have a lower thermal impact on the oscillator than the hardware component due to heat generation.

Modifying the rate of heat generation may include increasing an energy consumption rate of the hardware component. Increasing the energy consumption rate of the hardware component may include increasing execution of a workload hosted by the data processing system and that uses the hardware component during execution of the workload.

Increasing the energy consumption rate of the hardware component may also include reconfiguring execution of a workload hosted by the data processing system and that uses the hardware component during execution of the workload to use a second hardware component of the data processing system during the reconfigured execution of the workload.

The second hardware components may be positioned (e.g., closer to) to have a higher thermal impact on the oscillator than the hardware component due to heat generation.

Increasing an energy consumption rate of the hardware component may also include overriding an operation of a thermal control circuit of the data processing system to prevent the thermal control circuit from cooling (e.g., preventing the thermal control circuit from activating fans) the hardware component.

Treating the clock signal provided by the oscillator as being inaccurate may include marking at least one communication received by the data processing system as being impacted by inaccuracy of the clock signal.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide any number and types of computer implemented services. To provide computer implemented services, the system of FIG. 1 may include one or more data processing systems 100. The one or more data processing systems 100 may perform any number and type of computer implemented services. The computer implemented services may include, for example, database services, electronic communication (e.g., email, instant messaging, etc.), voice communication services (e.g., voice over internet protocol), and/or any other types of communication services. Data processing systems 100 may include any number (e.g., 100A, 100N) of data processing systems.

To provide these computer implemented services, data processing systems 100 may be operably connected to each other and/or other devices (not shown) via one or more wired and/or wireless connections (not shown, may include the Internet, radio access network, wireless local area networks, etc.). Data processing systems 100 may communicate with any number of other devices when providing the computer implemented services. Data processing systems 100 may each provide similar and/or different computer implemented services. Any of data processing systems 100 may provide computer implemented services independently and/or cooperatively with other data processing system and/or other devices (not shown).

To communicate with other data processing systems and/or other devices as well as providing the computer implemented services, data processing systems 100 may include functionality to synchronize various clocks and/or other time keeping functionalities with other devices. For example, when operably connected to other devices, data processing systems 100 may include functionality to identify time keeping drifts that, if not corrected, may cause the clocks of the data processing systems to be sufficiently desynchronized from the clocks of other devices that various services that depend on synchronized (or substantial synchronized within a predetermined range) clocks.

For example, to effectively communicate and/or perform various functionalities, data processing systems 100 may need to accurate date (e.g., timestamp) when network data units (e.g., packets in an internet protocol network) are received and/or sent.

These drifts may be due, for example, to differences and/or instability in oscillators used by the data processing systems 100 to perform time keeping functionalities. For example, an oscillator (e.g., an oscillator circuit) may provide a repeating pattern of electrical signal that occurs periodically. However, due to small differences in various oscillator circuits, the oscillators of different data processing systems may generate a pattern with some variance. Similarly, the pattern of electrical signal may also vary depending on environmental conditions such as temperature (e.g., a rate of oscillation of the oscillator may decrease/increase as temperature decreases/increases, etc.). These differences between the oscillators of varying data processing systems may cause the data processing systems to desynchronize their time keeping functionalities (e.g., the data processing systems may believe that time is passing at different rates due to the different rate of oscillation of the oscillators).

To synchronize their clocks, data processing systems 100 and/or other devices may exchange information with one another. The exchanged information may allow data processing systems 100 to correct their timekeeping function and synchronize time keeping with other data processing systems.

In general, embodiments disclosed herein relate to systems, devices, and methods for maintaining synchronization of timekeeping functionality of data processing systems 100 during periods of time where data processing systems 100 may not exchange information usable to correct for drift or other non-ideal behavior of oscillators and/or other components of timekeeping circuitry of a data processing system. For example, during various periods of time (referred to herein also as a "holdover period") data processing systems 100 may not be able to communicate with one another and/or other devices for timekeeping synchronization purposes. Consequently, any of data processing systems 100 may become sufficiently timekeeping desynchronized with the other data processing systems (e.g., which may result in network data units being improperly dated and/or other functionalities being impacted).

To attempt to maintain synchronization of timekeeping functionality, data processing systems 100 may attempt to reduce changes in the operation of timekeeping devices, such as oscillators, used for timekeeping functionality. By reducing changes in the functionality (e.g., operation such as pattern of provided electrical signals) of the timekeeping devices, data processing systems 100 may be less likely to desynchronize during holdover periods. Accordingly, a data processing system in accordance with an embodiment may be able to provide various functionalities even during periods of time when timekeeping desynchronization correction functionality of the data processing systems 100 is unavailable.

To attempt to reduce the changes in the functionality of the timekeeping devices, data processing systems may (i) identify a temperature of the timekeeping device at a start of the holdover period and (ii) perform various actions to maintain the identified temperature of the timekeeping device throughout the holdover period and correct for divergences of the temperature of the timekeeping device from the identified temperature. By doing so, previous correction factors (e.g., usable to synchronize oscillators of various data processing systems) that may have been otherwise identified outside of the holdover period may continue to be effectively used to perform timekeeping functionality that is synchronized with other data processing systems and/or other devices.

Any of data processing systems 100 may be implemented using a computing device such as a host or server, a personal computer (e.g., desktops, laptops, and tablets), a "thin" client, a personal digital assistant (PDA), a Web enabled appliance, a mobile phone (e.g., Smartphone), and/or any other type of computing device or system. For additional details regarding computing devices, refer to FIG. 4. For additional details regarding data processing systems 100, refer to FIG. 2A.

The system of FIG. 1 may include any number and types of data processing systems 100. Any of the aforementioned devices may operate independently and/or cooperatively to provide enhanced computer network services. Data processing systems 100 may provide such services to, for example, user of the data processing systems 100, to other data processing systems 100, and/or to other devices not shown in FIG. 1.

Data processing systems 100 may be operably connected to any of each other and/or other devices via a communication system (not shown). The communication system may include one or more networks that facilitate communication between data processing systems 100 (or portions thereof) and/or other devices. The networks may include, for example, wired networks, wireless network, public networks, private network, radio access networks, the Internet, etc.

While illustrated in FIG. 1 as including a limited number of specific components, a system in accordance with an embodiment may include fewer, additional, and/or different components than those illustrated therein.

Figure 2A:
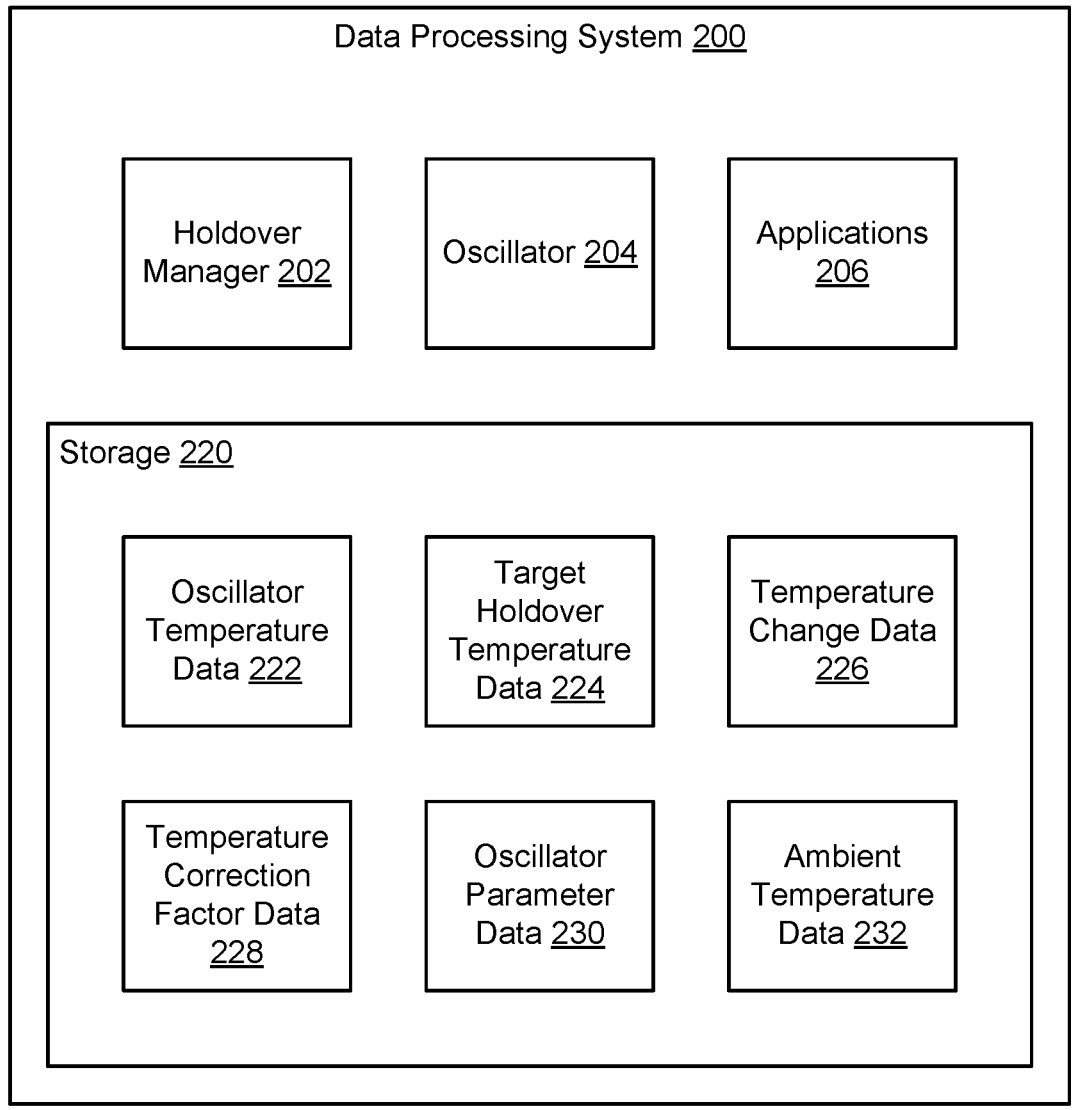
FIG. 2A shows a block diagram illustrating a data processing system in accordance with an embodiment.

Turning to FIG. 2A, a diagram of an example data processing system 200 in accordance with an embodiment is shown. Data processing system 200 may be similar to any of data processing systems 100.

As discussed above, data processing system 200 may provide any number and type of computer implemented services. To provide its functionality, data processing systems may include holdover manager 202, oscillator 204, applications 206, and storage 220. Each of these components is discussed below.

Holdover manager 202 may manage the operation of data processing system 200 during holdover periods. When doing so, holdover manager 202 may (i) identify a temperature of oscillator 204 at a start of the holdover period, (ii) attempt to maintain a temperature of oscillator 204 at the identified temperature during the holdover period, (iii) attempt to correct for divergences in the temperature of oscillator 204 from the identified temperature, and/or (iv) when the divergences in the temperature of oscillator 204 exceed certain limits, attempt to take action to remediate the impact of time desynchronization due to changes in the operation of oscillator 204 due to the temperature diverges. By doing so, embodiments disclosed here may facilitate continued operation of data processing system 200 during periods of time where data processing systems 200 is unable to perform various timekeeping resynchronization functions in cooperation with other devices.

Figure 2B:
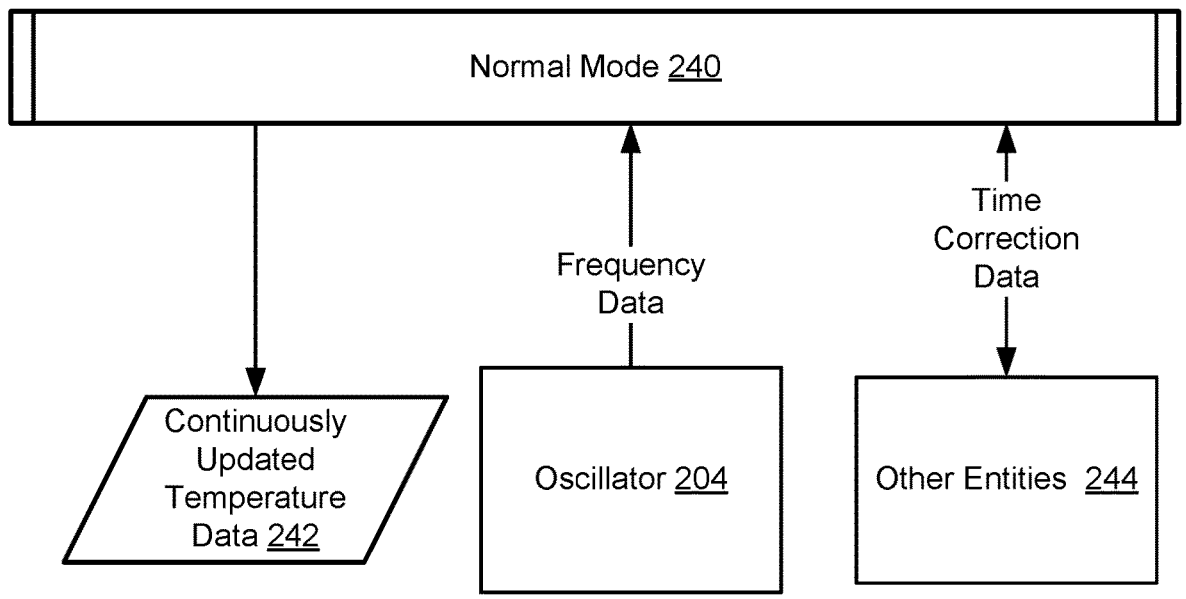
FIGS. 2B-C show diagrams illustrating processes and data flows during the processes in accordance with an embodiment.
Figure 2C:
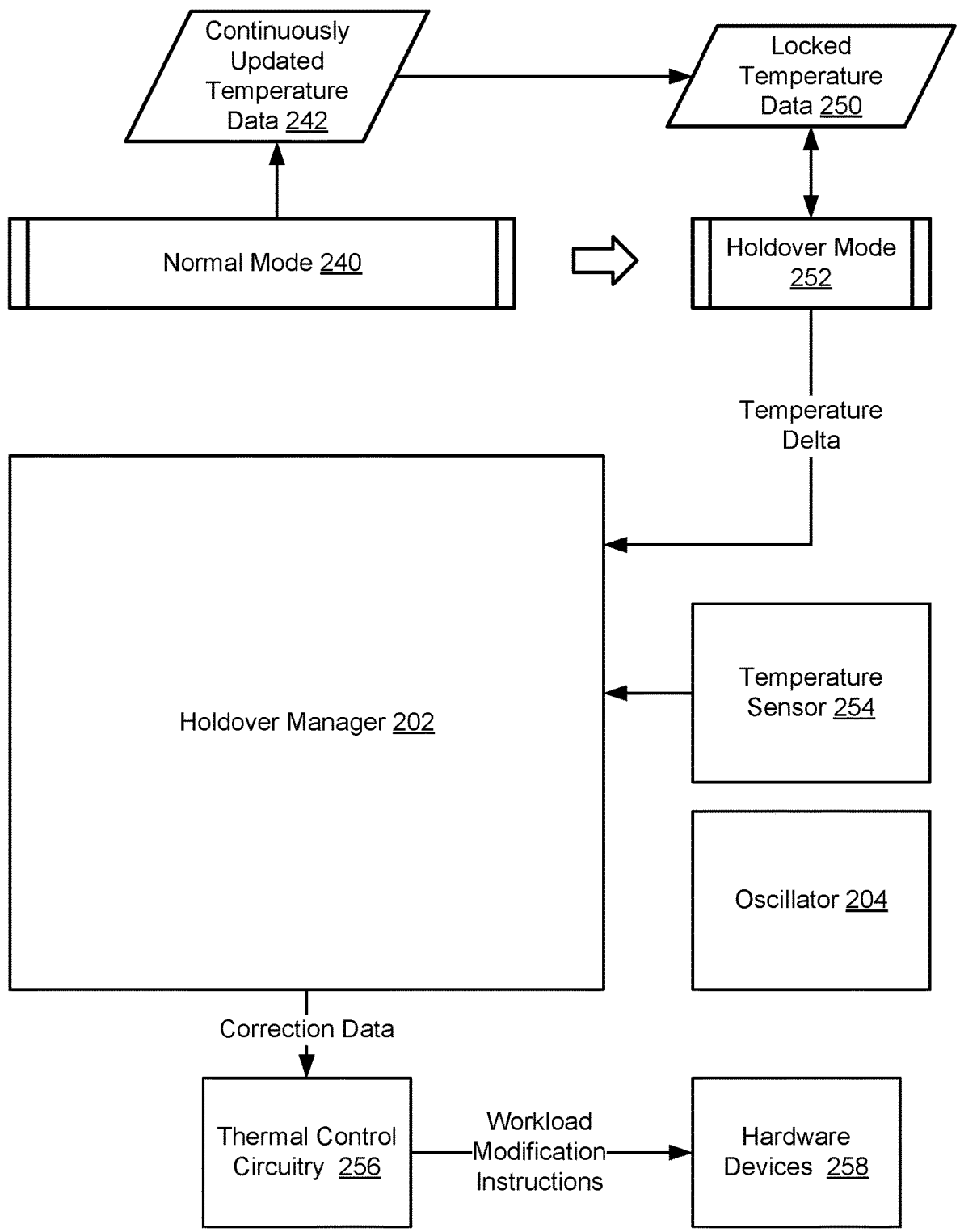
Figure 3:
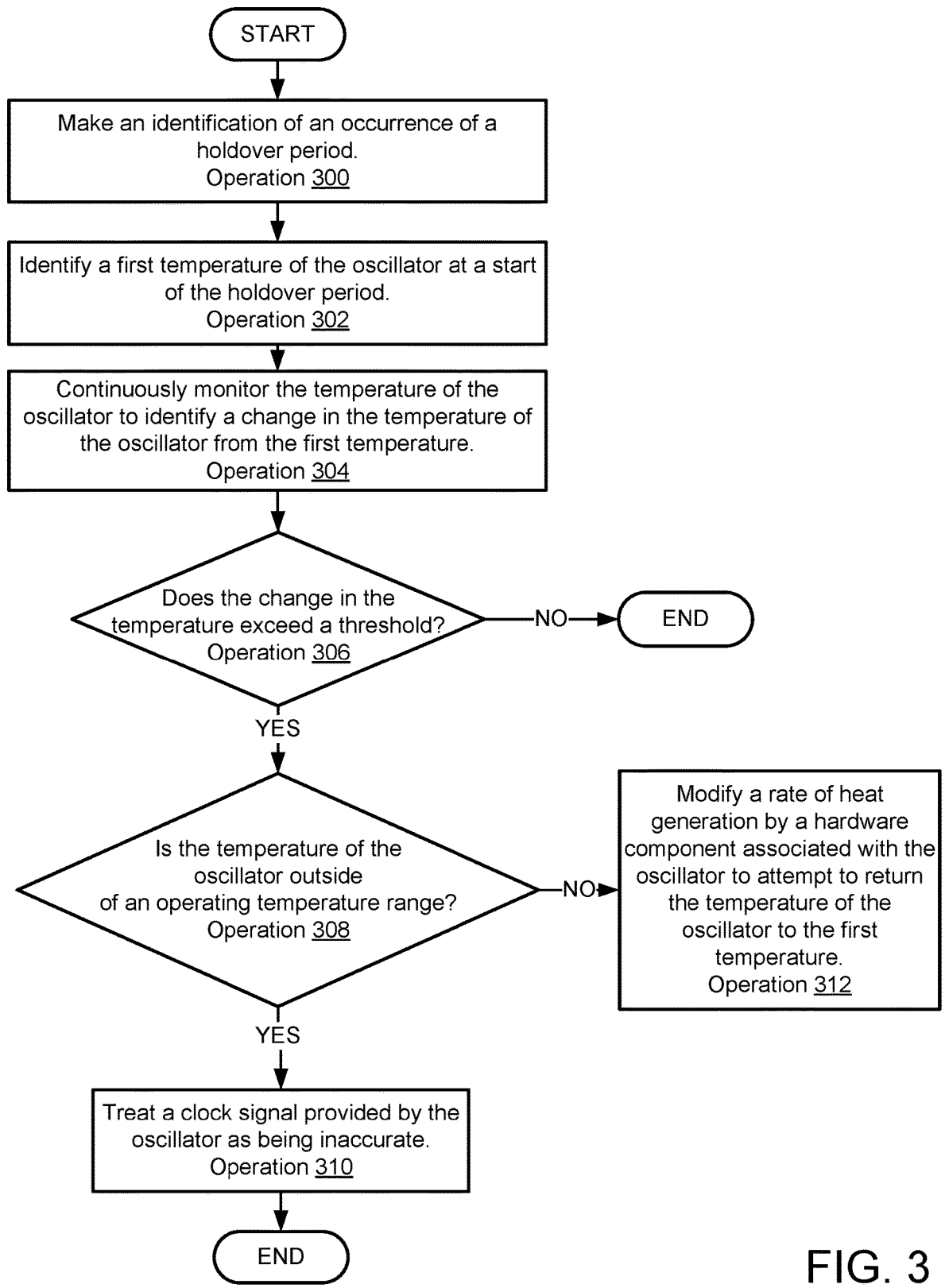
FIG. 3 shows a flow diagram illustrating a method of managing operation of a data processing system in accordance with an embodiment.

When performing its functionality, holdover manager 202 may perform all, or a portion, of the method illustrated in FIG. 3 and/or may use, generate, and/or manage any of the data structures (e.g., 222-232) stored in storage 220. For additional details regarding holdover manager 202, refer to FIGS. 2B-2C and the corresponding discussion.

Applications 206 may provide the computer implemented services provided by data processing system 200. As part of these services, applications 206 may rely on the timekeeping functionality of data processing system 200. For example, applications 206 may need to date and/or rely on dates applied to network data units received by and/or transmitted by data processing systems 200. Inaccurately dated network data units may impact (e.g., impair, disable, etc.) the functionality of applications 206.

Additionally, applications 206 may place variable workloads on hardware components of a data processing system resulting in a data processing system (e.g., including oscillator 204) to heat and/or cool over time. Consequently, the internal temperature of a data processing system may not be stable by virtue of the workloads imposed on the components of the data processing system.

Oscillator 204 may, as noted above, provide timing signals such as clock signals used for timekeeping functionality. Oscillator 204 may be implemented with one or more circuit elements (e.g., crystals, resistors, capacitors, inductors, integrated circuits, etc.). The operation of oscillator 204 may be temperature sensitive. Consequently, the rate of clock signals provided by oscillator 204 may depend on the temperature of the oscillator (e.g., to a sufficient degree that changes in temperature may cause previously received correction factors and/or other types of timekeeping synchronization data to become outdated/stale).

In an embodiment, one or more of holdover manager 202 and applications 206 are implemented using a hardware device including circuitry. The hardware device may be, for example, a digital signal processor, a field programmable gate array, or an application specific integrated circuit. The circuitry may be adapted to cause the hardware device to perform the functionality of holdover manager 202 and/or applications 206. Holdover manager 202 and/or applications 206 may be implemented using other types of hardware devices without departing from embodiments disclosed herein.

In an embodiment, one or more of holdover manager 202 and applications 206 are implemented using a processor adapted to execute computing code stored on a persistent storage that when executed by the processor performs the functionality of holdover manager 202 and/or applications 206 discussed throughout this application. The processor may be a hardware processor including circuitry such as, for example, a central processing unit or a microcontroller. The processor may be other types of hardware devices for processing digital information without departing from embodiments disclosed herein.

In an embodiment, storage 220 is implemented using physical devices that provide data storage services (e.g., storing data and providing copies of previously stored data). The devices that provide data storage services may include hardware devices and/or logical devices. For example, storage 220 may include any quantity and/or combination of memory devices (i.e., volatile storage), long term storage devices (i.e., persistent storage), other types of hardware devices that may provide short term and/or long-term data storage services, and/or logical storage devices (e.g., virtual persistent storage/virtual volatile storage).

For example, storage 220 may include a memory device (e.g., a dual in line memory device) in which data is stored and from which copies of previously stored data are provided. In another example, storage 220 may include a persistent storage device (e.g., a solid-state disk drive) in which data is stored and from which copies of previously stored data is provided. In a still further example, storage 220 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 220 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Storage 220 may store data structures including, for example, oscillator temperature data 222, target holdover temperature data 224, temperature change data 226, temperature correction factor data 228, oscillator parameter data 230, and/or ambient temperature data 232.

Holdover manager 202 may monitor the ambient temperature (e.g., stored as ambient temperature data 232) during a non-holdover periods of time and compare the ambient temperature data 232 with oscillator parameter data 230 which may define various temperature sensitivities of oscillator 204.

To manage the operation of oscillator 204, a temperature of the oscillator (e.g., which may be stored as oscillator temperature data 222) may be continuously monitored. A temperature sensor may be used to continuously monitor (e.g., during non-holdover and holdover periods of time) the temperature of oscillator 204.

When a holdover period starts, the temperature of oscillator 204 may be stored as target holdover temperature data 224.

During the holdover period, the temperature of the oscillator may continue to be monitored and compared to target holdover temperature data 224 to identify any delta in temperature (e.g., which may be stored as temperature change data 226).

To attempt to remediate the impact of the delta in temperature on timekeeping functionality of data processing system 200, temperature correction factor data 228 may be calculated by comparing the difference between the temperature change data 226 and the oscillator frequency slope over time parameter from oscillator parameter data 230 to identify a temperature and/or duration of time to which a temperature of the oscillator 204 may be set to correct for the temperature delta. However, if the temperature delta causes temperature correction factor data 228 to exceed an oscillator thermal parameters which may also be specified by oscillator parameter data 230 (which may be identified heuristically in a laboratory setting), then it may be determined that the operation of oscillator 204 has exceeded its operating temperature range and may not be corrected by modifying the temperature of oscillator 204 for a duration of time. In an instance where oscillator 204 is outside of an operating temperature range, various remedial actions may be taken to reduce the impact on the impaired timekeeping functionality of data processing system 200.

Oscillator parameter data 230 may include an oscillator frequency slop over time parameter and maximum thermal shift over time (e.g., a threshold that if exceeded indicates that correction via temperature modification may be insufficient to address the temperature drift induced changes in operation of oscillator 204). These parameters may affect the performance stability of the oscillator and may be used to correct for some degree of changes in thermal state of oscillator 204. Oscillator parameter data 230 may also include thermal curves derived from laboratory simulations of similar thermal conditions. The thermal conditions may be a moving average value or other statistical characterization.

While illustrated in FIG. 2A as including a limited number of specific components, a data processing system in accordance with an embodiment may include fewer, additional, and/or different components than shown herein. Further, while various data structures have been illustrated and described in FIG. 2A, any of the data structures may be implemented with various types of structures (e.g., lists, tables, linked lists, databases, etc.), may be stored in different locations, and/or may be spanned across any number of devices without departing from embodiments disclosed herein.

While illustrated in FIG. 2A with a limited number of specific components, a data processing system 200 may include additional, fewer, and/or different components without departing from embodiments disclosed herein.

As discussed above, data processing systems may include functionality to update the operation of their hardware devices (e.g., by performing various timekeeping correction functionalities cooperatively and/or in isolation). FIGS. 2B-2C show diagrams illustrating data flows and operations that may be performed to update operation of a hardware device such as holdover manager 202 in accordance with an embodiment.

Turning to FIG. 2B, a first data flow diagram in accordance with an embodiment is shown. In the diagram, a process of cooperatively synchronizing timekeeping functionality between multiple data processing systems is shown. As seen in the diagram, the processes may include normal mode 240, continuously updated temperature data 242, oscillator 204, and other entities 244.

During normal mode 240 (e.g., during non-holdover periods of time where data processing systems may communicate with one another for timekeeping synchronization purposes), a temperature of oscillator 204 may be continuously measured and collected over a period of time to generate information indicating temperature changes with respect to time. The temperature of oscillator 204 may be stored as continuously updated temperature data 242. The frequency of oscillator 204 may also be collected and stored. The frequency of oscillator 204 may be taken into account and/or adjusted when performing timekeeping synchronization with other data processing systems.

For example, time correction data may be exchanged with other entities 244 (e.g., other data processing systems or other types of devices) such that differences between the frequency of electrical signals provided by oscillator 204 and/or oscillators of other devices may be corrected for over time. Thus, during normal mode 240, changes in the operation of oscillator 204 may be corrected for via exchange of information with other entities 244. Accordingly, shifts in the temperature of oscillator 204 may not need to be actively managed due to the ability to perform cooperative timekeeping synchronization with other devices. However, during holdover periods of time, cooperative timekeeping synchronization may not be available to correct for changes in the frequency of oscillator 204 due to changes in its temperature.

Turning to FIG. 2C, a second data flow diagram in accordance with an embodiment is shown. In the diagram, a process of perform independent timekeeping synchronization for a data processing system is shown. As seen in the diagram, the process may include normal mode 240 and holdover mode 252.

During a normal mode 240, temperature of oscillator 204 is measured and collected. The temperature of oscillator 204 may be stored as continuously updated temperature data 242. Continuously updated temperature data 242 may be collected using a temperature sensor (e.g., 254).

When a holdover period occurs, a data processing system may switch to holdover mode 252 of operation. When the holdover mode 252 of operation begins, the updated temperature data collected during the normal mode 240 and prior to the holdover period is identified. The identified updated temperature (e.g., first temperature) may be stored as locked temperature data 250.

A change in the temperature from the identified updated temperature may be identified. The change in the temperature may be identified by calculating the difference between a temperature of oscillator 204 during the holdover period and locked temperature data 250.

Holdover manager 202 may compare the change in the temperature (e.g., temperature delta) to a set of thermal parameters that affect stability performance of oscillator 204 to identify a thermal correction that, if implemented, may negate the impact of the temperature delta on the timekeeping functionality of the data processing system hosting oscillator 204. The set of thermal parameters may include a frequency slope over time and a maximum thermal shift over time.

Holdover manager 202 may also compare the change in the temperature to thermal curves obtained from laboratory simulations. The laboratory simulations may be performed using moving average calculation and temperature correction factor circuits. Holdover manager 202 may calculate a temperature correction factor and provide the temperature correction factor (e.g., "correction data") to a thermal control circuitry 256 in order to remediate the impact of temperature delta. The correction data may specify, for example, a target temperature and/or duration of time at the target temperature.

Based on the correction data, thermal control circuitry 256 may modify a rate of heat generation by a hardware component (e.g., hardware devices 258) associated with the oscillator. For example, thermal control circuitry 256 may generate and send workload modification instructions directly to hardware devices 258 and/or indirectly to a manager of hardware devices 258. Thermal control circuitry 256 may be implemented with, for example, (i) discrete management circuitry that may communicate with hardware devices 258 via sideband communications and/or (ii) functionality provided by a management entity such as an operating system, driver, etc. that may manage workloads performed using hardware devices 258. The workload modification instructions may cause hardware devices 258 to modify the quantity of electrical power consumed to either cause the rate of heat generation to increase or decrease thereby causing a temperature of oscillator 204 to be modified in accordance with correction data.

Thus, as seen in FIG. 2C, embodiments disclosed herein may facilitate timekeeping synchronization even during periods of time (e.g., holdover periods) when cooperative timekeeping synchronization may not be performed. By doing so, embodiments disclosed herein may provide a data processing system that may be more likely to be able to provide computer implemented services that depend on timekeeping synchronization between multiple devices.

As discussed above, the components of FIG. 1 may perform various methods to maintain accuracy of an oscillator by modifying a rate of heat generation by a hardware component associated with the oscillator which may otherwise prevent performance of the computing devices. FIG. 3 illustrates an example of method that may be performed by the components of FIG. 1. In the diagrams discussed below and shown in these figures, any of the operations may be repeated, performed in different orders, and/or performed in parallel with or a partially overlapping in time manner with other operations.

Turning to FIG. 3, a flow diagram illustrating a method for performing timekeeping in accordance with an embodiment is shown. The method may be performed, for example, by a data processing system, a holdover manager, and/or other components illustrated in FIGS. 1-2C.

At operation 300, an identification of an occurrence of a holdover period is made. The identification of the occurrence of the holdover period may be made, for example, by identifying that timekeeping correction data from other entities (e.g., 244, FIG. 2B) is no longer available. For example, the timekeeping correction data may no longer be available due to packet loss or other mechanism in a communication system that operably connects the data processing system and the other entities (e.g., which are communicating with one another and rely on synchronization as part of the communication). The lack of availability of timekeeping correction data may be the start of the holdover period.

During the holdover period, the timekeeping correction data is unavailable thereby rendering communications (and/or other operations that rely on synchronization) challenging due to changes in operation of the oscillator due to thermal drift. For example, timekeeping desynchronization may cause network data units to be improperly dated.

While described above with respect to sending of synchronization data digitally, it will be understood that the synchronization data may be transmitted via an analog signal and in such scenarios a holdover period may be identified based on a magnitude (or other signal integrity indicator) of the carrier used to transmit the analog signal. In such scenarios, a low analog signal magnitude may be treated as the start of a holdover period.

While described with respect to specific mechanisms above, it will be understood that the holdover period may be identified via other processes without departing from embodiments disclosed herein.

At operation 302, in response to the identification, a first temperature of the oscillator at a start of the holdover period is identified. The first temperature of the oscillator may be identified at the start of the holdover period by (i) prior to the start of the holdover period, monitoring the temperature of the oscillator and (ii) at the start of the holdover period, latching or otherwise locking the monitored temperature of the oscillator.

At operation 304, after identifying the first temperature and during the holdover period, the temperature of the oscillator is continuously monitored to identify a change in the temperature from the first temperature. The temperature of the oscillator may be continuously monitored to identify the change in the temperature from the first temperature by continuing the temperature monitoring (e.g., during the normal operation period) after the temperature of the oscillator is latched or otherwise locked (e.g., during the holdover period following the normal operation period).

To monitor the temperature of the oscillator, direct or indirect measurements of the temperature of the oscillator may be made in accordance with any measurement methodology (e.g., periodic, responsive to the occurrence of event, on demand, etc.).

At operation 306, a first determination regarding whether the change in the temperature exceeds a threshold is made. The first determination may be made by comparing a magnitude of the continuously monitored temperature of the oscillator to the magnitude of the first temperature to identify whether a delta between these temperatures exists. If a delta between these temperatures exists, then the delta may be compared to the threshold to determine whether the delta is within or exceeds the threshold. If the delta exceeds the threshold, then it may be determined that the change in the temperature exceeds the threshold.

If it is determined that the change in the temperature exceeds the threshold, then the method may proceed to operation 308 following operation 306. Otherwise, the method may end following operation 306. Ending following operation 306 may indicate that the temperature of the oscillator does not warrant correction at this time.

At operation 308, a second determination regarding whether the temperature of the oscillator is outside of an operating temperature range of the oscillator is made. The second determination may be made by comparing the temperature of the oscillator to the operating temperature range.

If it is determined that the temperature is outside of the operating temperature range, then the method may proceed to operation 310 following operation 308. Otherwise, the method may proceed to operation 312 following operation 308.

At operation 310, a clock signal provided by the oscillator is treated as being inaccurate. The clock signal may be treated as being accurate by (i) marking communications as being impacted by an inaccurate clock signal (e.g., so that the data derived from the communications may be treated as being suspected of being inaccurate, including errors, etc.), (ii) notifying an administrator that the clock signal is inaccurate (e.g., to initiate corrective action), (iii) logging the inaccurate clock signal as being present, and/or (iv) performing other actions to remediate and/or otherwise reduce the impact of the inaccurate clock signal on operation of the data processing system.

The method may end following operation 310.

Returning to operation 308, the method may proceed to operation 312 following operation 308 when it is determined that the temperature of the oscillator is outside of the operating temperature range.

At operation 312, a rate of heat generation by a hardware component associated with the oscillator is modified to attempt to return the temperature of the oscillator to the first temperature and/or correct for the change in the temperature of the oscillator from the first temperature. The rate of heat generation by the hardware component may be modified by increasing or decrease the rate of heat generation by the hardware component associated with the oscillator. The rate of heat generation may be modified by (i) suspending performance of a workload which utilizes the hardware component, (ii) initiating a new workload which utilizes the hardware component, (iii) depowering (or modifying the amount of power provided to) the hardware component, and/or (iv) transferring existing workloads between other hardware components and the hardware component.

Additionally, to attempt to return the temperature of the oscillator to the first temperature and/or correct for the change in the temperature of the oscillator, the operation of various thermal management components (e.g., fans) may be modified. For example, the operation of fans may be disabled (e.g., even during periods of time where the hardware component may regularly be cooled) to increase the local ambient temperature which may indirectly heat the oscillator and/or the operation of fans may be enabled (e.g., even during periods of time where the hardware component may not regularly be cooled) to decrease the local ambient temperature which may indirectly cool the oscillator. This cooling may be synergistic with that provided by the hardware component thereby further accelerating heating and/or cooling of the oscillator. To do so, normal operation of these devices may be overridden thereby placing them into abnormal thermal states (e.g., otherwise not desirable).

The method may end following operation 312.

Using the method illustrated in FIG. 3, embodiments disclosed herein may provide a data processing system with improved capabilities and functionalities. These capabilities may be provided, for example, using the operations illustrated in FIG. 3. For example, by performing operation 312, embodiments disclosed herein may enable a data processing system to continue to provide communication services using an oscillator that is not temperature stabilized by the oscillator itself.

Figure 4:
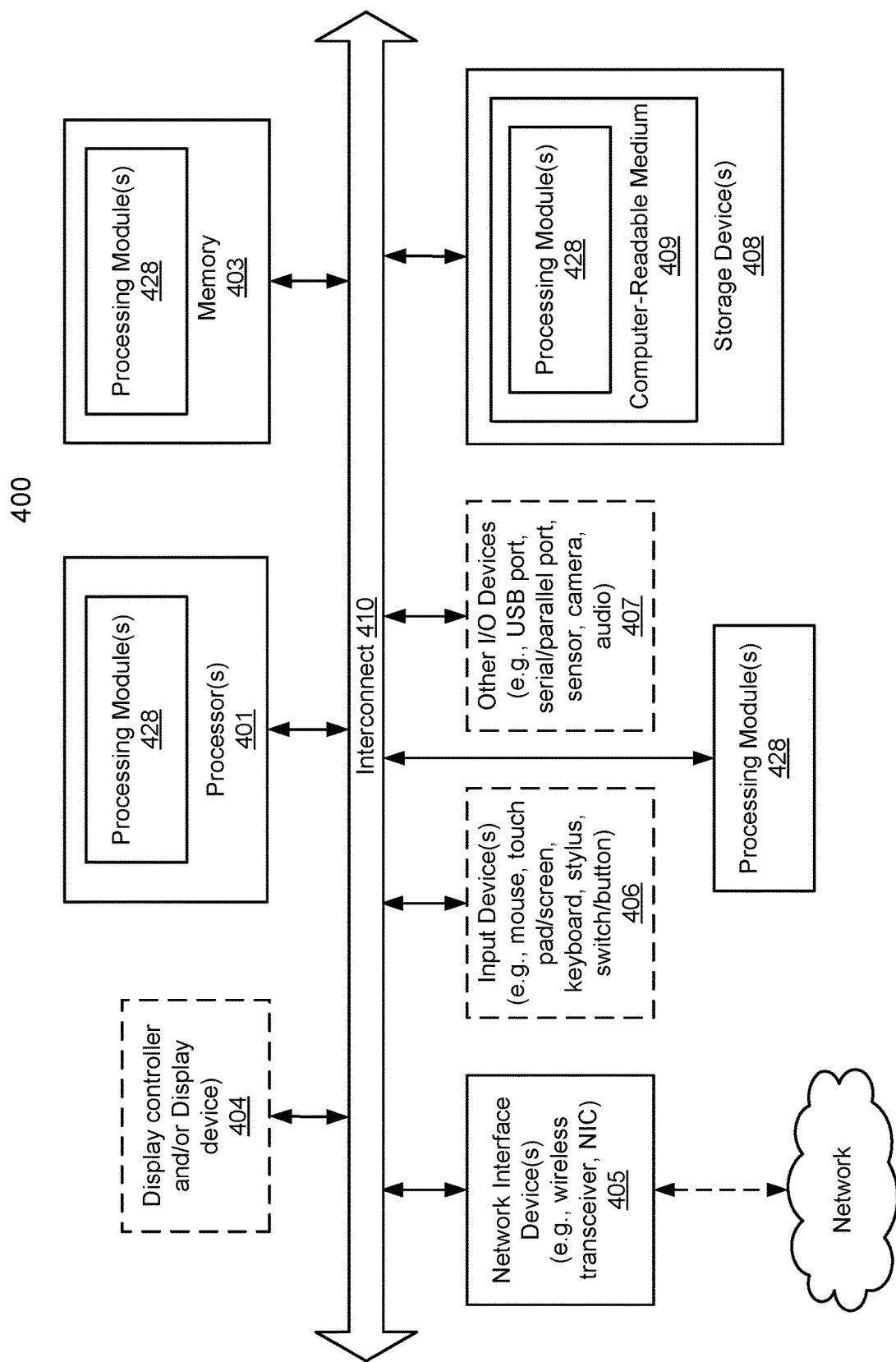
FIG. 4 shows a block diagram illustrating a computing device in accordance with an embodiment.

Any of the components illustrated in FIGS. 1-2C may be implemented with one or more computing devices. Turning to FIG. 4, a block diagram illustrating an example of a computing device in accordance with an embodiment is shown. For example, system 400 may represent any of the data processing systems and/or computing devices described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-408 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft Mac OS/iOS from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional 10 device(s) 407. Network interface device(s) 405 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computer-implemented method for performing timekeeping using an oscillator of a data processing system, the method comprising:
    making an identification of an occurrence of a holdover period during which cooperative timekeeping synchronization with other devices for the oscillator is unavailable;
    in response to the identification:
        identifying a first temperature of the oscillator at a start of the holdover period;
        after identifying the first temperature and during the holdover period, continuously monitoring the temperature of the oscillator to identify a change in the temperature from the first temperature; and
        making a first determination regarding whether the change in the temperature exceeds a threshold;
        in a first instance of the first determination whether the temperature exceeds the threshold:
            making a second determination regarding whether the temperature of the oscillator is outside of an operating temperature range of the oscillator;
            in a first instance of the second determination where the oscillator is outside of the operating temperature range of the oscillator:
                treating a clock signal provided by the oscillator as being inaccurate; and
            in a second instance of the second determination where the oscillator is inside of the operating temperature range:
                modifying a rate of heat generation by a hardware component associated with the oscillator to attempt to return the temperature of the oscillator to the first temperature.

2. The computer-implemented method of claim 1, wherein the data processing system comprises a second oscillator that provides a clock signal to a processor, the oscillator provides a second clock signal to a communication device of the data processing system, the second clock signal being used for communication purposes, and the second oscillator is not used for communication purposes.

3. The computer-implemented method of claim 2, wherein the data processing system is configured to perform workloads that vary over time and cause the oscillator to be heated and cooled over time.

4. The computer-implemented method of claim 1, wherein modifying the rate of heat generation comprises:
reducing an energy consumption rate of the hardware component.

5. The computer-implemented method of claim 4, wherein reducing the energy consumption rate of the hardware component comprises:
suspending execution of a workload hosted by the data processing system and that uses the hardware component during execution of the workload.

6. The computer-implemented method of claim 5, wherein reducing the energy consumption rate of the hardware component comprises:
reconfiguring execution of a workload hosted by the data processing system and that uses the hardware component during execution of the workload to use a second hardware component of the data processing system during the reconfigured execution of the workload.

7. The computer-implemented method of claim 6, wherein the second hardware components is positioned to have a lower thermal impact on the oscillator than the hardware component due to heat generation.

8. The computer-implemented method of claim 1, wherein modifying the rate of heat generation comprises:
increasing an energy consumption rate of the hardware component.

9. The computer-implemented method of claim 8, wherein increasing the energy consumption rate of the hardware component comprises:
increasing execution of a workload hosted by the data processing system and that uses the hardware component during execution of the workload.

10. The computer-implemented method of claim 8, wherein increasing the energy consumption rate of the hardware component comprises:
reconfiguring execution of a workload hosted by the data processing system and that uses the hardware component during execution of the workload to use a second hardware component of the data processing system during the reconfigured execution of the workload.

11. The computer-implemented method of claim 10, wherein the second hardware components is positioned to have a higher thermal impact on the oscillator than the hardware component due to heat generation.

12. The computer-implemented method of claim 8, wherein increasing an energy consumption rate of the hardware component comprises:
overriding an operation of a thermal control circuit of the data processing system to prevent the thermal control circuit from cooling the hardware component.

13. The computer-implemented method of claim 1, wherein treating the clock signal provided by the oscillator as being inaccurate comprises:
marking at least one communication received by the data processing system as being impacted by inaccuracy of the clock signal.

14. A non-transitory machine-readable medium having instructions stored therein, which when executed by a processor, cause a data processing system to perform operations for performing timekeeping using an oscillator of a data processing system, the operations comprising:
making an identification of an occurrence of a holdover period during which cooperative timekeeping synchronization with other devices for the oscillator is unavailable;
in response to the identification:
identifying a first temperature of the oscillator at a start of the holdover period;
after identifying the first temperature and during the holdover period, continuously monitoring the temperature of the oscillator to identify a change in the temperature from the first temperature; and
making a first determination regarding whether the change in the temperature exceeds a threshold;
in a first instance of the first determination whether the temperature exceeds the threshold:
making a second determination regarding whether the temperature of the oscillator is outside of an operating temperature range of the oscillator;
in a first instance of the second determination where the oscillator is outside of the operating temperature range of the oscillator:
treating a clock signal provided by the oscillator as being inaccurate; and
in a second instance of the second determination where the oscillator is inside of the operating temperature range:
modifying a rate of heat generation by a hardware component associated with the oscillator to attempt to return the temperature of the oscillator to the first temperature.

15. The non-transitory machine-readable medium of claim 14, wherein the data processing system comprises a second oscillator that provides a clock signal to a processor, the oscillator provides a second clock signal to a communication device of the data processing system, the second clock signal being used for communication purposes, and the second oscillator is not used for communication purposes.

16. The non-transitory machine-readable medium of claim 15, wherein the data processing system is configured to perform workloads that vary over time and cause the oscillator to be heated and cooled over time.

17. A data processing system, comprising:
an oscillator;
a processor; and
a memory coupled to the processor to store instructions, which when executed by the processor, cause the processor to perform operations for performing timekeeping using the oscillator, the operations comprising:
making an identification of an occurrence of a holdover period during which cooperative timekeeping synchronization with other devices for the oscillator is unavailable;
in response to the identification:
identifying a first temperature of the oscillator at a start of the holdover period;
after identifying the first temperature and during the holdover period, continuously monitoring the temperature of the oscillator to identify a change in the temperature from the first temperature; and
making a first determination regarding whether the change in the temperature exceeds a threshold;

in a first instance of the first determination whether the temperature exceeds the threshold:
  making a second determination regarding whether the temperature of the oscillator is outside of an operating temperature range of the oscillator;
  in a first instance of the second determination where the oscillator is outside of the operating temperature range of the oscillator:
    treating a clock signal provided by the oscillator as being inaccurate; and
in a second instance of the second determination where the oscillator is inside of the operating temperature range:
  modifying a rate of heat generation by a hardware component associated with the oscillator to attempt to return the temperature of the oscillator to the first temperature.

18. The data processing system of claim 17, wherein the data processing system comprises a second oscillator that provides a clock signal to a processor, the oscillator provides a second clock signal to a communication device of the data processing system, the second clock signal being used for communication purposes, and the second oscillator is not used for communication purposes.

19. The data processing system of claim 17, wherein modifying the rate of heat generation comprises:
  reducing an energy consumption rate of the hardware component.

20. The data processing system of claim 19, wherein reducing the energy consumption rate of the hardware component comprises:
  suspending execution of a workload hosted by the data processing system and that uses the hardware component during execution of the workload.

* * * * *